United States Patent
Cypher et al.

(10) Patent No.: US 8,645,632 B2
(45) Date of Patent: Feb. 4, 2014

(54) SPECULATIVE WRITESTREAM TRANSACTION

(75) Inventors: Robert E. Cypher, Saratoga, CA (US); Haakan E. Zeffer, Santa Clara, CA (US); Anders Landin, San Carlos, CA (US)

(73) Assignee: Oracle America, Inc., Redwood Shores, CA (US)

( * ) Notice: Subject to any disclaimer, the term of this patent is extended or adjusted under 35 U.S.C. 154(b) by 1049 days.

(21) Appl. No.: 12/365,732

(22) Filed: Feb. 4, 2009

(65) Prior Publication Data

US 2010/0199048 A1    Aug. 5, 2010

(51) Int. Cl.
*G06F 12/06* (2006.01)

(52) U.S. Cl.
USPC .................................. 711/141; 711/E12.026

(58) Field of Classification Search
USPC .......................................................... 711/141
See application file for complete search history.

(56) References Cited

U.S. PATENT DOCUMENTS

| 7,376,793 | B2 | 5/2008 | Cypher |
| 2006/0288173 | A1* | 12/2006 | Shen .............................. 711/141 |
| 2007/0022253 | A1* | 1/2007 | Cypher et al. ................ 711/141 |

* cited by examiner

*Primary Examiner* — Kenneth Lo
(74) *Attorney, Agent, or Firm* — Park, Vaughan, Fleming & Dowler LLP; Anthony P. Jones

(57) ABSTRACT

Embodiments of the present invention provide a system that performs a speculative writestream transaction. The system starts by receiving, at a home node, a writestream ordered (WSO) request to start a WSO transaction from a processing subsystem. The WSO request identifies a cache line to be written during the WSO transaction. The system then sends an acknowledge signal to the processing subsystem to enable the processing subsystem to proceed with the WSO transaction. During the WSO transaction, the system receives a second WSO request to start a WSO transaction. The second WSO request identifies the same cache line as to be written during the subsequent WSO transaction. In response to receiving the second WSO request, the system sends an abort signal to cause the processing subsystem to abort the WSO transaction.

16 Claims, 10 Drawing Sheets

| | | |
|---|---|---|
| RTS | READ-TO-SHARE | REQUESTS READ-ONLY COPY OF CACHE LINE |
| RTO | READ-TO-OWN | REQUESTS WRITEABLE COPY OF CACHE LINE |
| RS | READ-STREAM | REQUESTS READ-ONCE COPY OF CACHE LINE |
| WS | WRITE-STREAM | REQUEST TO WRITE ENTIRE CACHE LINE AND TO SEND TO MEMORY |
| WSO | WRITESTREAM ORDERED | REQUEST TO WRITE ENTIRE CACHE LINE AND TO SEND TO MEMORY. MAY BE TERMINATED WITHOUT MODIFYING THE CACHE LINE |
| CPI | COPYBACK INVALIDATE | RETRIEVE CACHE LINE FROM REMOTE PROCESSOR AND INVALIDATE CACHE LINE IN REMOTE PROCESSOR |
| INV | INVALIDATE | INVALIDATE CACHE LINE IN REMOTE PROCESSOR |
| PULL | PULL FOR WRITE | PULL DATA FOR WRITE OPERATION |
| ACK | ACKNOWLEDGE | ACKNOWLEDGMENT |
| ACKN | ACKNOWLEDGE - NO DATA | ACKNOWLEDGE REQUEST – NO DATA PROVIDED (CAN BE USED TO DENY REQUESTS) |
| ABORT | ABORT | SENT FROM HOME NODE TO ATTEMPT TO ABORT WRITESTREAM ORDERED TRANSACTION |
| DATA | DATA | PACKET WHICH CONVEYS DATA |

FIG. 3

| REQUEST PACKET | INITIATOR RECEIVES | INITIATOR SENDS |
|---|---|---|
| RTS | DATA | |
| RTO | DATA | |
| RS | DATA | |
| WS | PULL | DATA |
| WSO | PULL AND/OR ABORT | DATA AND/OR ACKN OR ACK |

SPECULATIVE WRITESTREAM TRANSACTION

BACKGROUND

1. Field of the Invention

The present invention relates to techniques for improving the performance of computer systems. More specifically, the present invention relates to a method and an apparatus for performing speculative writestream transactions in a computer system.

2. Related Art

Modern multiprocessing computer systems often include two or more processors (or processor cores) that are used to perform computing tasks. One common architecture in multiprocessing systems is a shared memory architecture in which multiple processors share a common memory. In shared memory systems, a cache hierarchy is typically implemented between the processors and a shared memory, wherein each processor can hold a cached copy of a given cache line. Because the cached copies of cache lines may be modified by the caching processor, shared memory multiprocessing systems use cache coherence protocols to ensure that any copies of the cache line in the cache hierarchy contain the same data value.

One common variant of shared memory systems is a distributed shared memory architecture, which includes multiple distributed "nodes" within which separate processors and memory reside. Each of the nodes is coupled to a network that is used to communicate with the other nodes. When considered as a whole, the memory included within each of the multiple nodes forms the shared memory for the computer system. Unfortunately, an access to memory stored in a remote node is significantly slower than an access to a memory in a local node. As a consequence, cache line write operations may suffer from severe performance degradation in a distributed shared memory system. This performance degradation occurs because if a cache line write operation is performed by a processor in a node that does not have write permission for the cache line, the write operation will be stalled until write permission can be acquired for the cache line.

To address the above-described problem, some coherence protocols include a "writestream" transaction that enables a processor to write an entire cache line to memory without receiving the previous contents of the cache line or retaining a copy of the cache line in the processor's cache. In these systems, because the previous contents of the cache line are not needed, the previous contents of the cache line are discarded. Consequently, when a processor initiates such a transaction, the processor must commit to carrying through with the transaction and writing the entire cache line to memory. In addition, for some writestream transactions, the system requires strong ordering semantics, meaning that the writestream transactions must complete in order. Because writestream transactions must occur in order, the possibility of deadlocks arises where multiple processors are initiating writestream transactions involving the same set of cache lines. Specifically, a first processor's writestream transaction for cache line A can be blocked by a second processor's writestream transaction for cache line A while the second processor's writestream transaction for cache line B is blocked by the first processor's writestream transaction for cache line B. Because the processors prevent each other from continuing with their transactions, neither processor makes forward progress and deadlock occurs.

Moreover, many multiprocessing systems support pipelining for writes to memory. However, unlike writestream transactions that use weakly ordered semantics, strongly-ordered writestream transactions must be completed in order. Therefore strongly-ordered writestream transactions cannot be pipelined, which means that these transactions cannot benefit from the performance advantage pipelining.

SUMMARY

Embodiments of the present invention provide a system (e.g., computer system 100 in FIG. 1) that performs a speculative writestream transaction. The system starts by receiving, at a home node, a writestream ordered (WSO) request to start a first WSO transaction from a first processing subsystem. The WSO request identifies a cache line to be written during the first WSO transaction. The system then sends an acknowledge signal from the home node to the first processing subsystem to enable the first processing subsystem to proceed with the first WSO transaction. During the first WSO transaction, the system receives a second WSO request to start a second WSO transaction from a second processing subsystem at the home node. The second WSO request identifies the same cache line as to be written during the second WSO transaction. In response to receiving the second WSO request, the system sends an abort signal from the home node to the first processing subsystem to cause the first processing subsystem to abort the first WSO transaction.

In some embodiments, the system receives a denial signal from the first processing subsystem at the home node in response to the abort signal. The denial signal indicates that the first processing subsystem will not abort the first WSO transaction and that the first processing subsystem is proceeding with the first WSO transaction. The system subsequently receives the cache line from the first processing subsystem at the home node and writes the cache line to memory in the home node. In these embodiments, the first processing subsystem sends the denial signal when: (1) the WSO transaction is an oldest cache line write operation pending for the first processing subsystem; or (2) when the first processing subsystem has already sent the cache line to the home node to be written.

In some embodiments, the system is configured to receive an acknowledge signal from the first processing subsystem in response to the abort signal. The acknowledge signal indicates that the first processing subsystem has aborted the first WSO transaction.

In some embodiments, the system is configured to subsequently receive a WSO request to retry the aborted first WSO transaction that is sent from the first processing subsystem. The system then sends the acknowledge signal to the first processing subsystem to enable the first processing subsystem to retry the first WSO transaction. (Note that this could involve cancelling an outstanding WSO transaction from another processing subsystem.)

In some embodiments, upon receiving a WSO request from another processing subsystem during the retried first WSO transaction, the system is configured to send the abort signal to the first processing subsystem to cause the first processing subsystem to again abort the first WSO transaction. Upon aborting and retrying the first WSO transaction a predetermined number of times, the system is configured to receive, at the home node, a forward-progress signal from the first processing subsystem. The forward-progress signal ensures that a next time that the aborted first WSO transaction is retried, the first WSO transaction completes.

In some embodiments, when receiving the forward-progress signal, the system is configured to receive, at the home node, a request to start a WS transaction instead of a WSO transaction from a first processing subsystem, wherein the request to start the WS transaction identifies the cache line as to be written during the WS transaction, and wherein the WS transaction is not aborted by subsequent WSO requests involving the same cache line.

In some embodiments, the system is configured to subsequently receive a WS request to retry the aborted first WSO transaction that is sent from the first processing subsystem. The system then sends the acknowledge signal to the first processing subsystem to enable the first processing subsystem to perform a WS transaction in place of the aborted first WSO transaction.

In some embodiments, during a WSO transaction, the system is configured to write an entire cache line from a processing subsystem to the home node without obtaining write permission for the cache line in the processing subsystem and without storing a copy of the cache line in a local cache in the processing subsystem.

In some embodiments, when sending the acknowledge signal, the system is configured to send a PULL request to cause the first processing subsystem to send data for the entire cache line to the home node for storage in a memory.

BRIEF DESCRIPTION OF THE FIGURES

FIG. 3 presents a table illustrating various packet types that may be used in embodiments of the present invention.

In the figures, like reference numerals refer to the same figure elements.

DETAILED DESCRIPTION

Figure 1:
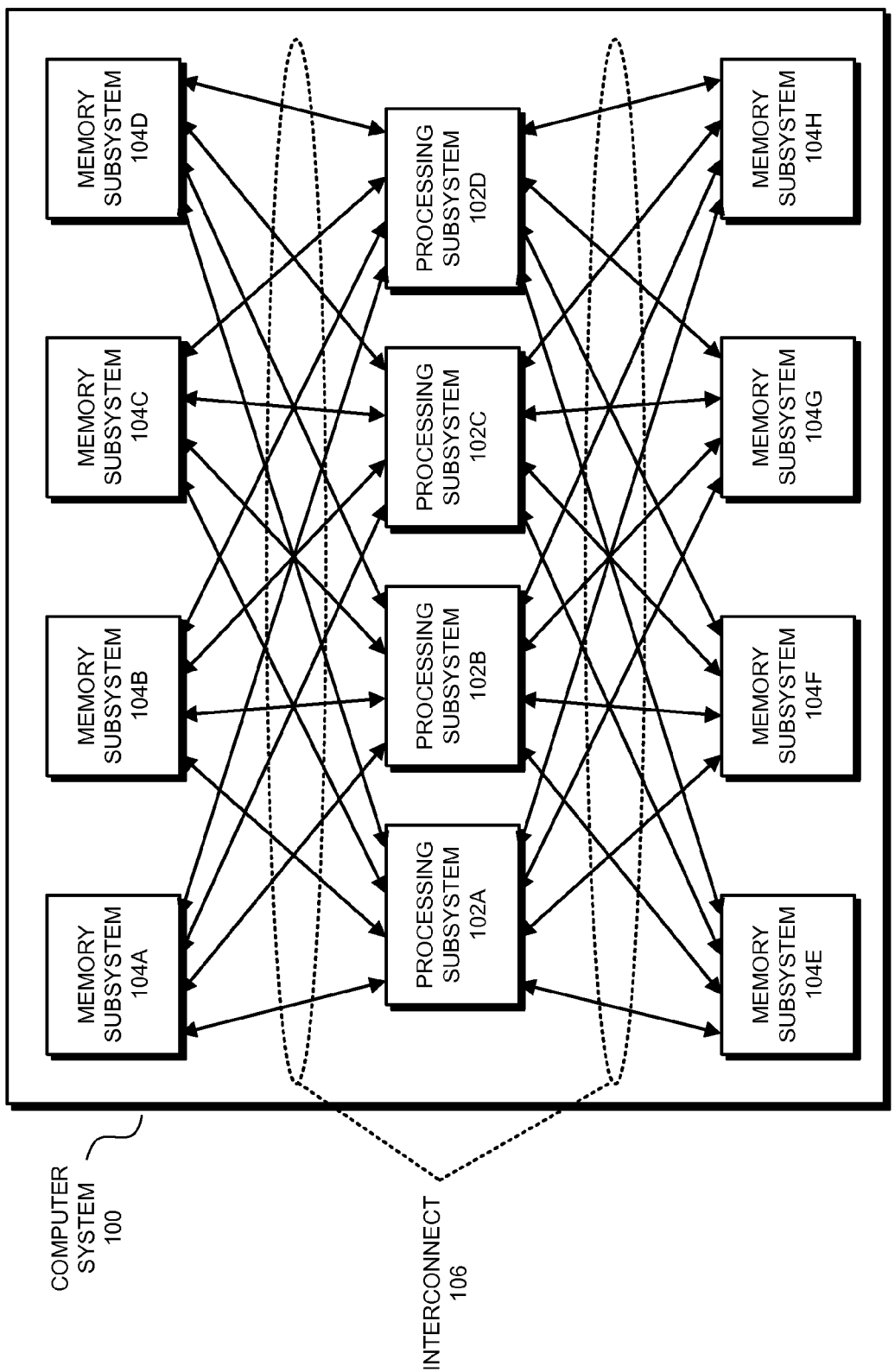
FIG. 1 presents a block diagram illustrating a computer system in accordance with embodiments of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The methods and processes described below can be included in hardware modules. For example, the hardware modules can include, but are not limited to, processor chips, application-specific integrated circuit (ASIC) chips, field-programmable gate arrays (FPGAs), memory chips, and other programmable-logic devices now known or later developed. When the hardware modules are activated, the hardware modules perform the methods and processes included within the hardware modules. For example, in some embodiments of the present invention, the hardware modules include one or more dedicated circuits for performing the operations described below. In alternative embodiments of the present invention, the hardware modules are general-purpose computational circuits (e.g., a microprocessor or an ASIC), and when the hardware module is activated, the hardware module executes program code (e.g., BIOS, firmware, program code, etc.) that configures the general-purpose circuits to perform the operations described below.

Terminology

Throughout the description, we use the following terminology in describing embodiments of the present invention. These terms are generally known in the art, but are defined below to clarify the subsequent descriptions.

We use the term "cache line" to refer to a number of contiguous bytes of memory that are treated as a coherency unit. For example, in various embodiments of the present invention, a cache line includes 64 bytes, 32 bytes, or another number of bytes. A modification to any part of a coherency unit causes the computer system 100 (see FIG. 1) to regard the whole coherency unit as modified. Thus, if one byte within a cache line is updated, the entire cache line is considered to be updated. Note that although we discuss "cache lines" for simplicity, alternative embodiments use "cache blocks" that contain more or fewer bytes than a cache line in a coherency unit. For example, one embodiment of a cache block includes a single byte, while another embodiment includes two or more cache lines.

The term "dirty" when applied to a cache line in a cache indicates that the value of the cache line in that cache may not match the value of the cache line in another location in a cache or in memory. For example, a cache line can be dirty in a processor's cache because the cache line has been modified in that cache.

The term "forward progress" as used in this description refers to a processor's ability to continue performing useful computational work. Thus, if two processors are deadlocked and are unable to perform useful computational work, neither of the processors makes forward progress.

The term "strongly ordered semantics" as used in this description refers to embodiments in which write operations from a processor are required to complete in program order. As described below, in accordance with strong ordering semantics, writestream and writestream ordered transactions are required to complete in program order. Note that the counterpart "weak ordering semantics" enables writes and hence writestream and writestream ordered transactions to complete out of program order.

We refer to a "directory-based" cache coherence protocol in this description. A directory-based cache coherence protocol is a coherence protocol that involves maintaining one or more directories that contain information relating to the coherency status of associated cache lines. A record in the directory is used to determine how to respond to coherency requests (read requests, write requests, etc.) involving the associated cache line. For example, upon receiving a request for a cache line in a writable state, a memory controller can read the directory to determine if a copy of the cache line is recorded as being held by another processor in the system. If so, the memory controller can signal the other processor to invalidate its copy of the cache line and possibly return the data (if the cache line data was modified by the other processor). The memory controller can then deliver the cache line to the requesting processor. On the other hand, if the directory shows that the cache line is not held by another processor in the system, the memory controller can simply deliver the cache line to the requesting processor.

We refer to elements in embodiments of the present invention (e.g., a processing subsystem 102) as being "configured to" perform particular operations. In these embodiments, the elements can include general purpose circuits that are configured to perform the described operations. In some embodiments with general-purpose circuits, the general-purpose circuits can be configured using instructions (e.g., BIOS code, firmware, application code, etc.). In these embodiments, the elements can further include one or more dedicated mechanisms (e.g., dedicated circuits or functional blocks) that when activated perform the described operations or cause the general-purpose circuits to perform the described operations.

Note that elements referred to in this description with a particular reference number followed by a letter (i.e., "102A") may be collectively referred to by the reference number alone. For example, processing subsystems 102A-102D in FIG. 1 can be collectively referred to as processing subsystems 102.

Computer System

FIG. 1 presents a block diagram illustrating a computer system 100 in accordance with embodiments of the present invention. Computer system 100 includes processing subsystems 102A-102D and memory subsystems 104A-104H.

Processing subsystems 102 may generally include any device configured to perform accesses to memory subsystems 104. For example, each of processing subsystems 102 may comprise one or more microprocessors and/or I/O subsystems. I/O subsystems may include devices such as a direct memory access (DMA) engine, an input-output bridge, a graphics device, a networking device, an application-specific integrated circuit (ASIC), or another type of device. Microprocessors and I/O subsystems are well known in the art and are not described in more detail.

Memory subsystems 104 include memory for storing data and instructions for processing subsystems 102. For example, the memory systems 104 can include dynamic random access memory (DRAM), synchronous dynamic random access memory (SDRAM), synchronous random access memory (SRAM), flash memory, or another type of memory.

Processing subsystems 102 can include one or more instruction and/or data caches which may be configured in a variety of arrangements. For example, the instruction and data caches can be set-associative or direct-mapped. Each of the processing subsystems 102 within computer system 100 may access data in any of the memory subsystems 104, potentially caching the data. Moreover, coherency is maintained between processing subsystems 102 and memory subsystems 104 using a coherence protocol. For example, some embodiments use the MESI protocol. Alternative embodiments use a different protocol, such as the MSI protocol. Cache coherence protocols such as the MESI or MSI protocol are well known in the art and are not described in detail.

In some embodiments of the present invention, memory subsystems 104 are configured as a distributed shared memory. In these embodiments, each physical address in the address space of computer system 100 is assigned to a particular memory subsystem 104, herein referred to as the "home" memory subsystem or the "home node" for the address. For example, in some embodiments, the address space of computer system 100 may be allocated among memory subsystems 104 in a cache-line interleaved manner. In these embodiments, a given memory subsystem 104 is not allocated blocks of contiguous cache lines. Rather, in a system which includes N memory subsystems, each memory subsystem may be allocated every Nth cache line of the address space. Alternative embodiments use other methods for allocating storage among memory subsystems, such as storing contiguous blocks of cache lines in each of the memory subsystems.

Although we describe a "home node" as being a node in a distributed shared memory system, in alternative embodiments, home nodes can be nodes within a computer system based on a different memory architecture. Generally, a home node is any type of computational resource where a cache line resides within a computer system. For example, a home node can be any memory location where a given memory controller keeps a record of the coherency status of the cache line. In some embodiments of the present invention, there is only one home node for all the cache lines in the system. For example, in embodiments of the present invention where the shared memory is one functional block (i.e., one integrated circuit chip), the home node can include the whole memory.

Each memory subsystem 104 may also include a directory suitable for implementing a directory-based coherence protocol. In some embodiments, a memory controller in each node is configured to use the directory to track the states of cache lines assigned to the associated memory subsystem 104 (i.e., for cache lines for which the node is the home node). Directories are described in detail with respect to FIG. 2.

Within computer system 100, each processing subsystem 102 is coupled via point-to-point interconnect 106 (interchangeably referred to as "interconnect 106") to each of memory subsystems 104. For example, processing subsystem 102A is coupled to memory subsystems 104A-104H. Interconnect 106 may include any type of mechanism that can be used for conveying control and/or data messages. For example, interconnect 106 may comprise a switch mechanism that includes a number of ports (e.g., a crossbar-type mechanism), one or more serial or parallel buses, or other such mechanisms. Interconnect 106 may be implemented as an electrical bus, a circuit-switched network, or a packet-switched network.

In some embodiments, within interconnect 106, address packets are used for requests (interchangeably called "coherence requests") for an access right or for requests to perform a read or write to a non-cacheable memory location. For example, one such coherence request is a request for a readable or writable copy of a cache line. Subsequent address packets may be sent to implement the access right and/or ownership changes needed to satisfy a given coherence request. Address packets sent by a processing subsystem 102 may initiate a "coherence transaction" (interchangeably called a "transaction"). Typical coherence transactions involve the exchange of one or more address and/or data packets on interconnect 106 to implement data transfers, ownership transfers, and/or changes in access privileges. Packet types and transactions in embodiments of the present invention are described in more detail below.

Figure 2:
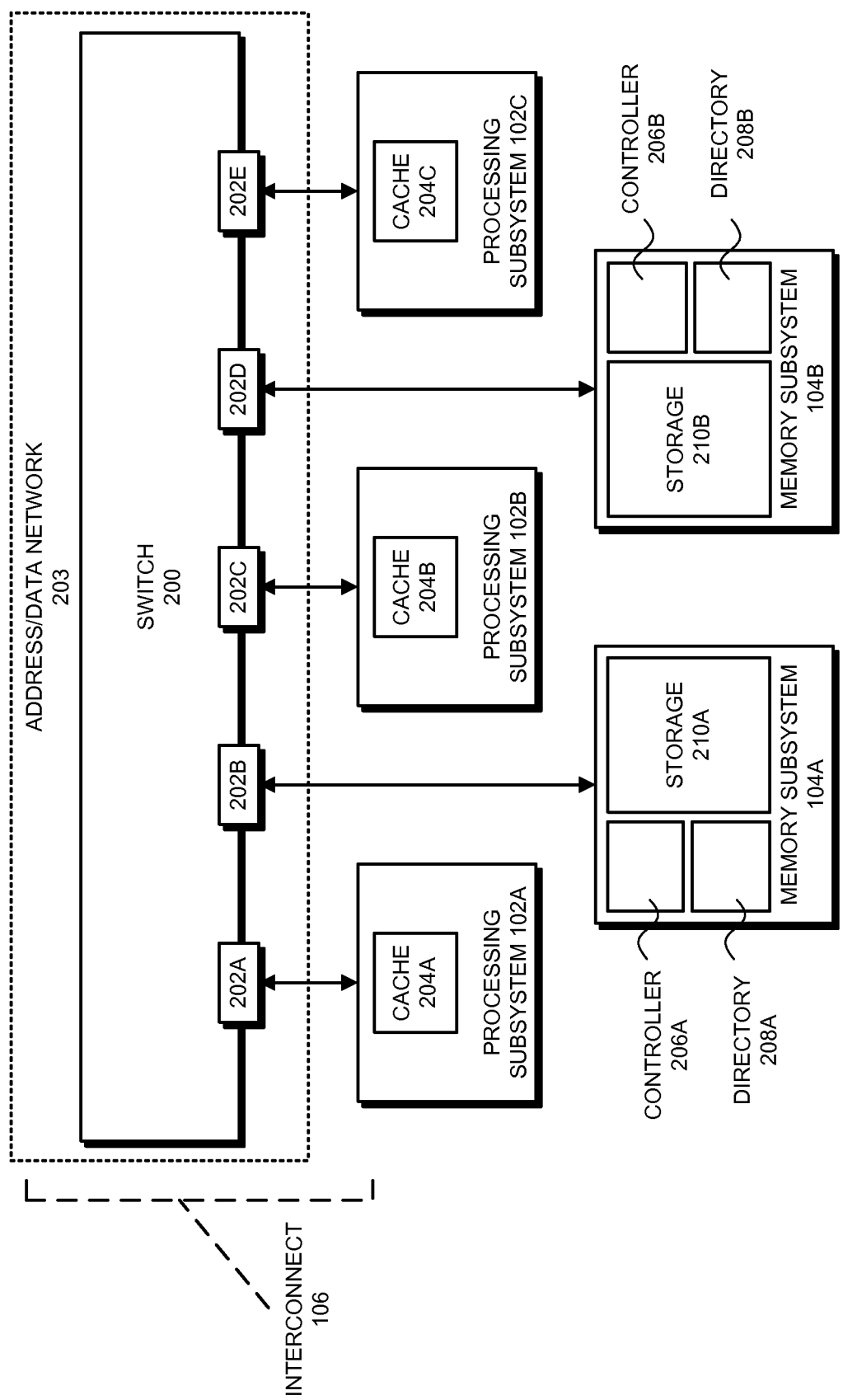
FIG. 2 is a diagram illustrating an expanded portion of a computer system in accordance with embodiments of the present invention.

FIG. 2 is a diagram illustrating an expanded portion of computer system 100 in accordance with embodiments of the present invention. As shown in FIG. 2, the expanded portion of computer system 100 includes processing subsystems 102A-102C, memory subsystems 104A-104B, and address/data network 203.

Address/data network 203 is one embodiment of interconnect 106. In this embodiment, address/data network 203 includes a switch 200 including ports 202A-202E. In the embodiment shown, ports 202 may include bi-directional links or multiple unidirectional links. Note that although address/data network 203 is presented in FIG. 2 for the purpose of illustration, in alternative embodiments, address/data network 203 does not include switch 200, but instead includes one or more busses or other type of interconnect.

As shown in FIG. 2, processing subsystems 102A, 102B, and 102C are coupled to switch 200 via ports 202A, 202C, and 202E. Processing subsystems 102A-102C each include a respective cache 204A-204C configured to store memory data. Memory subsystems 104A and 104B are coupled to switch 200 via ports 202B and 202D, respectively, and include controllers 206A-206B, directories 208A-208B, and storages 210A-210B. Storage 210 can include random access memory (e.g., DRAM, SDRAM, etc.), flash memory, or any other suitable storage device.

Address/data network 203 facilitates communication between processing subsystems 102 within computer system 100. For example, processing subsystems 102 may perform reads or writes to memory that cause transactions to be initiated on address/data network 203. More specifically, a processing unit within processing subsystem 102A may perform a read of cache line A that misses in cache 204A. In response to detecting the cache miss, processing subsystem 102A may send a read request for cache line A to switch 200 via port 202A. The read request initiates a read transaction. In this example, the home node for cache line A may be memory subsystem 104A. Switch 200 may be configured to identify subsystem 104A as a home node of cache line A and send a corresponding request to memory subsystem 104A via port 202B.

As is shown in FIG. 2, each memory subsystem 104 includes a directory 208 for implementing the directory-based coherence protocol. In this embodiment, directory 208A includes an entry for each cache line for which memory subsystem 104A is the home node. Each entry in directory 208A can indicate the coherency state of the corresponding cache line in processing subsystems 102 in the computer system. Appropriate coherency actions may be performed by a particular memory subsystem 104 (e.g., invalidating shared copies, requesting transfer of modified copies, etc.) according to the information maintained in a directory 208.

A controller 206 within a memory subsystem 104 is configured to perform actions for maintaining coherency within a computer system according to the specific coherence protocol in use in computer system 100. The controllers 206 use the information in the directories 208 to determine coherency actions to perform. (Note that although we describe controllers 206 in memory subsystems 104 performing the actions for maintaining coherency, we generically refer to the memory subsystem 104 itself performing these operations. Specifically, within this description we sometimes refer to the "home node" for a cache line performing various actions.)

Computer system 100 can be incorporated into many different types of electronic devices. For example, computer system 100 can be part of a desktop computer, a laptop computer, a server, a media player, an appliance, a cellular phone, testing equipment, a network appliance, a calculator, a personal digital assistant (PDA), a hybrid device (e.g., a "smart phone"), a guidance system, audio-visual equipment, a toy, a control system (e.g., an automotive control system), manufacturing equipment, or another electronic device.

Although we describe computer system 100 as comprising specific components, in alternative embodiments different components can be present in computer system 100. Moreover, in alternative embodiments computer system 100 can include a different number of processing subsystems 102 and/or memory subsystems 104.

Packet Types and Transactions

As described above, in embodiments of the present invention, transactions may be initiated upon address/data network 203 by sending encoded packets that include a cache line address. FIG. 3 presents a table illustrating various packet types that may be used in embodiments of the present invention. The packet types shown in FIG. 3 can be loosely grouped as coherency requests, acknowledgments, and data packets. As shown in FIG. 3, the coherency requests include read-to-share (RTS), read-to-own (RTO), read-stream (RS), writestream (WS), writestream ordered (WSO), copyback invalidate (CPI), invalidate (INV), and pull for write (PULL). The acknowledgment packets include acknowledge (ACK), acknowledge with no data returned (ACKN), and abort (ABORT).

The coherency requests initiate the following transactions between a processing subsystem 102 and a memory subsystem 104. An RTS packet is sent by a processing subsystem 102 to the home node to request a read-only copy of a cache line (i.e., to start a read transaction). An RTO packet is sent by a processing subsystem 102 to the home node to request a writeable copy of a cache line (i.e., to start a write transaction). A CPI packet is sent by a home node to retrieve a cache line from a processing subsystem 102 and then invalidate the cache line in the processing subsystem 102. An INV packet is sent by a home node to a processing subsystem 102 to invalidate a cache line in the processing subsystem 102. A PULL packet is sent by a home node to a processing subsystem 102 to cause the processing subsystem 102 to return data to the home node so that the data can be stored in the home node.

The RS, WS, and WSO packets can be used to initiate a transaction during which a full cache line is read from or written to memory without locally caching a copy of the cache line. More specifically, an RS packet is sent by a processing subsystem 102 to the home node to initiate a transaction to provide a requesting device with a "read-once" copy of a cache line. A WS packet is sent by a processing subsystem 102 to the home node to initiate a transaction during which the requesting processing subsystem 102 writes an entire cache line to memory (i.e., writes a cache line and then sends the entire cache line to memory). Because the entire cache line is written to memory during the WS transaction, the cache line need not be allocated in the requester's cache and data need not be received for the cache line.

A WSO packet is sent by a processing subsystem 102 to the home node to initiate a speculative transaction during which the requesting device writes an entire cache line to memory (i.e., writes a cache line and then sends the entire cache line to memory). Because the entire cache line is written to memory during the WSO transaction, the cache line need not be allocated in the requester's cache and data need not be received for the cache line. However, unlike the WS transaction, the WSO transaction enables the home node to abort the transaction without modifying the cache line. The abortion of WSO transactions is described in more detail below.

The acknowledgment packets have the following effects. The ACK packet can be sent by a processing subsystem 102 or a home node to acknowledge various requests. The ACKN packet can be sent by a processing subsystem 102 or a home node to acknowledge a request for data, but to indicate that no data will be provided. Note that the ACKN packet is used in some embodiments of the present invention to deny a given request. For example, a home node may respond with an ACKN to a request for a writeable copy of a cache line (i.e., to a RTO request from a processing subsystem). The ABORT packet can be sent by a home node to an initiating processing subsystem 102 in an attempt to abort a WSO transaction.

The data packet (DATA) can be used by a processing subsystem 102 or a memory subsystem 104 to send data. Different types of DATA packets may be used for conveying cacheable data, non-cacheable data, read-stream data, write-stream data, etc. Each such data packet may have a distinguishable identifier to indicate the packet's type.

Note that although we describe embodiments of the present invention using these packet types, different and/or additional packet types and/or coherence requests may be supported. In addition, subsets of the above packet types may be used. For example, different types of acknowledgments or pull requests may be utilized. In some embodiments, an ACKI packet can be used by a processing subsystem 102 to respond to an INV packet from a memory subsystem 104.

In some embodiments of the present invention, transactions that result in the reading or writing of a cache line may result in at least one response packet being sent by the home node to the initiating processing subsystem 102 on address/data network 203. In addition, some transactions may require that at least one packet in addition to the original transaction request packet be sent from the initiating processing subsystem 102 to the home node on the address/data network 203.

Figures 4, 5:
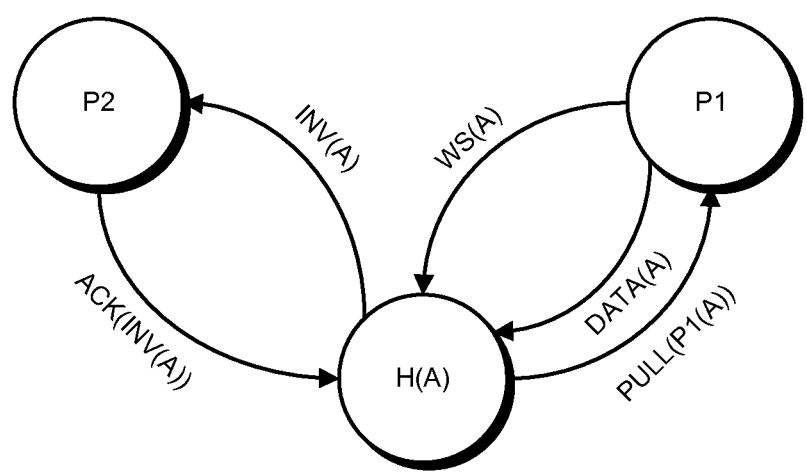
FIG. 4 presents a table of exemplary packets sent and received in response to a given request packet in accordance with embodiments of the present invention.
FIG. 5 presents a flowchart illustrating a WS transaction in which no deadlock occurs in accordance with embodiments of the present invention.

FIG. 4 presents a table of exemplary packets sent and received in response to a given request packet in accordance with embodiments of the present invention. The first column in FIG. 4 identifies a particular transaction type initiated by a processing subsystem 102 by sending a corresponding request packet, the second column identifies packets that are received by the initiating processing subsystem 102 from the home node as part of the transaction, and the third column identifies packets subsequently sent to the home node by the initiating processing subsystem 102 as part of the transaction.

As seen in FIG. 4, the RTS, RTO, and RS transactions result in the initiating processing subsystem 102 receiving requested DATA (i.e., DATA packets that include the requested data). However, in the case of a WS transaction, the initiating processing subsystem 102 receives a PULL packet, and may subsequently send a DATA packet. In addition, in the case of a WSO transaction, the initiator receives a PULL for the write data and may subsequently send a DATA packet.

Note that for the WSO transaction, the initiator may receive an ABORT (or ACKN) packet that aborts the WSO transaction and may respond to the ABORT (or ACKN) packet in a number of ways. The initiator may receive the ABORT (or ACKN) packet despite having previously received a PULL packet. An exemplary WSO transaction involving an ABORT packet is described in detail below.

WriteStream Transactions

As mentioned above, embodiments of the present invention enable writestream (WS) transactions in which processors (e.g., processing subsystems 102) write entire cache lines to memory without receiving the previous contents of the cache line. More specifically, during WS transactions, the initiating processor does not acquire read access for the cache line, nor is the cache line placed or allocated in the initiating processor's local cache (i.e., cache 204 in the processing subsystem 102). In order to enable the write of an entire cache line to memory without placing the cache line in the processor's cache, WS transactions are subject to a number of requirements. For example, during WS transactions, the previous contents of the cache line are discarded by the processor. Hence, an initiating processor should carry through with the WS transaction and write the entire cache line to memory or the cache line data can be corrupted. In addition, when a processor initiates a WS transaction to a cache line, the processor can lock the cache line to prevent further accesses of the cache line until the WS transaction is completed.

Processors are permitted to initiate multiple WS transactions simultaneously. However, in embodiments of the present invention in which strong ordering semantics are required, in order to prevent cache lines from being written to memory in an improper order, the WS transactions initiated by a processor are ordered with respect to one another within the processor. Thus, if a processor initiates a WS transaction involving cache line A, followed by a WS transaction involving cache line B, the WS transaction involving cache line A (i.e., the write of cache line A to memory) should be completed by the processor before the WS transaction involving cache line B can proceed.

Note that in embodiments in which weak ordering semantics are used, the writes resulting from WS transactions need not be completed in order. Thus, WS transactions can be pipelined to increase the efficiency of the write operations. However, because pipelining can result in writes being completed out of order, in embodiments that require strongly ordered semantics, WS transactions cannot be pipelined.

In these embodiments, the home nodes process WS requests for a given cache line in the order that they are received. In addition, when a home node begins processing a received WS request for a particular cache line, no further requests directed to that cache line may be processed by the home node until the prior request for the cache line is completed.

Figure 6:
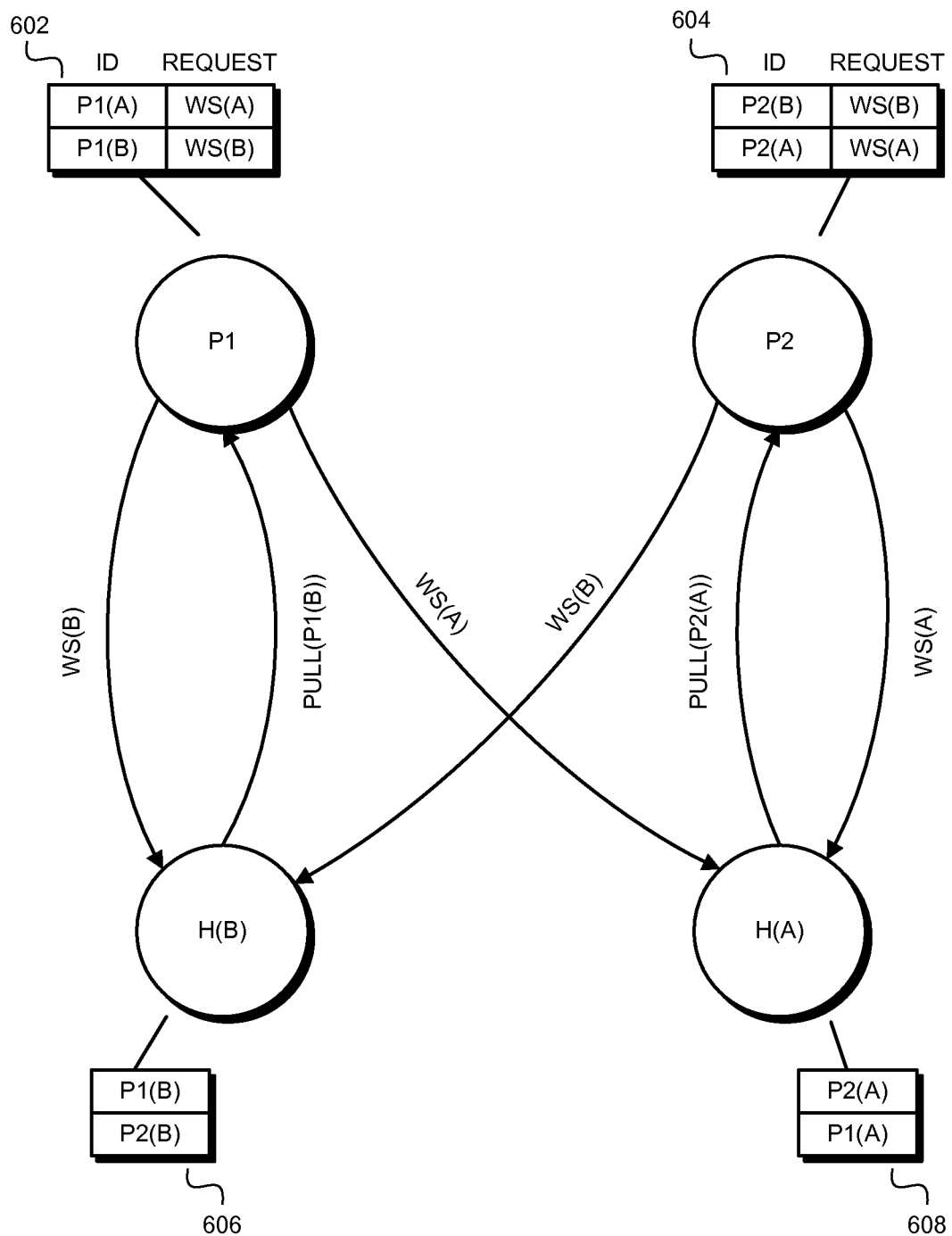
FIG. 6 presents a flowchart illustrating a WS transaction in which deadlock occurs in accordance with embodiments of the present invention.

As a consequence of the requirements of WS transactions, deadlock can occur when more than one processor is accessing the same cache lines using a WS transaction in embodiments where strong ordering semantics are required and writes are pipelined. For example, FIG. 5 presents a flowchart illustrating a WS transaction in which no deadlock occurs in accordance with embodiments of the present invention. In contrast, FIG. 6 presents a flowchart illustrating a WS transaction in which deadlock occurs in accordance with embodiments of the present invention.

FIG. 5 shows a first processor P1, a second processor P2, a home node H(A) of a cache line A. Before the WS transaction is initiated, a requesting processor P1 has invalid access to cache line A (P1 has an invalid "I" copy of cache line A), while a processor P2 has read access permission to cache line A (P2 has a shared "S" copy of cache line A).

The WS transaction shown in FIG. 5 starts when P1 sends a WS request (WS packet "WS(A)") to H(A) for the cache line. H(A) determines that P2 may have a shared copy of the cache line and sends an INV request (INV packet "INV(A)") to P2. If P2 contains a shared copy of cache line A, P2 then invalidates the copy of the cache line. P2 then sends an ACK response (ACK packet "ACK(INV(A))") to H(A). After receiving the ACK from P2, H(A) sends a PULL request (PULL packet "PULL(P1(A))") to P1 to request the write data for cache line A. P1 then conveys a DATA response (DATA packet "DATA(A)") that includes the write data to H(A). H(A) then stores the entire cache line in memory.

Note that for the purpose of illustration we present exemplary packets with particular formats, such as packet format "ACK(INV(A))." However, embodiments of the present invention can generally use any packet format that can be interpreted and understood by the receiving processing subsystem 102 or memory subsystem 104. For example, in some embodiments, each packet includes a number of bits that are organized into fields, each field containing digitally encoded information required for processing the request. In some embodiments, one of the fields in the some or all of the packets contains a transaction ID that is designated by the initiating processor. The transaction ID is used to keep track of the transaction for which sent and received packets are intended. In these embodiments, a transaction ID may be included with packets sent and received by the processor and/or the home node during the transaction to enable the processor and the home node to determine the transaction to which the packet applies.

Turning now to FIG. 6, a scenario is depicted in which a deadlock occurs using the WS transaction. FIG. 6 shows a first processor P1, a second processor P2, a home node H(B) of a cache line B, and a home node H(A) of a cache line A. Note that the embodiments shown in FIG. 6, strong ordering semantics are required and writes are pipelined.

Tables 602 and 604 in FIG. 6 illustrate the order of WS requests sent by processors P1 and P2, respectively. As shown, tables 602-604 each include a separate row for each WS request. The tables include a column which stores an identifier ("ID") that is used to uniquely identify the request, and a column ("Request") that identifies the corresponding request. In the tables, the higher entries represent older requests. Therefore, in table 602, the request identified as P1(A) occurred before the request identified as P1(B). Tables 606 and 608 illustrate the order in which WS requests are received by H(B) and H(A), respectively. As with tables 602-604, higher rows of tables 606-608 represent older requests.

As shown in FIG. 6, processors P1 and P2 initiate separate sequences of WS requests for cache lines A and B. Processor P1 sends a WS request for cache line A, followed by a WS request for cache line B. Processor P2 sends a WS request for cache line B, followed by a WS request for cache line A. As shown in tables 606 and 608, respectively, home node H(B) receives processor P1's WS request for cache line B prior to receiving processor P2's WS request, and home node H(A) receives processor P2's WS request for cache line A prior to receiving processor P2's WS request.

Recall that in embodiments where strong ordering semantics are required P1 and P2 should complete WS transactions in the order in which they are initiated. Therefore, given the sequence of requests shown in FIG. 6, P1 should complete request P1(A) prior to completing request P1(B), and P2 should complete request P2(B) prior to completing request P2(A). Because H(B) receives WS request P1(B) prior to WS request P2(B), H(B) processes WS request P1(B) first and sends a PULL request ("PULL(P1(B))") to P1 requesting the corresponding write data. Similarly, H(A) processes WS request P2(A) first and sends a PULL request ("PULL(P2(A))") to P2. However, P1 cannot process request PULL(P1(B)) until request PULL(P1(A)) is completed and P2 cannot process request PULL(P2(A)) until request PULL(P2(B)) is completed. Consequently, forward progress cannot be made by either processor and the processors are deadlocked.

WriteStream Ordered Transactions

Embodiments of the present invention provide a WSO transaction that avoids the deadlock that can be encountered using WS transactions in systems in which strong ordering semantics are required. Generally, the WSO transaction in these embodiments is a speculative transaction that enables a processor (e.g., a processing subsystem 102) to write an entire cache line to a cache line's home node without receiving the previous contents of the cache line or receiving write-permission for the cache line in the processor's local cache (e.g., cache 204 in the processing subsystem 102). Because the WSO transaction is speculative, the home node can signal the processor that initiated a first WSO transaction to abort the first WSO transaction without completing the write to the cache line when a second WSO transaction involving the same cache line is received during the first WSO transaction. In this way, these embodiments can avoid the deadlock that occurs with conflicting WS transactions.

Processors are permitted to initiate multiple WSO transactions simultaneously. However, in embodiments in which strong ordering semantics are required, in order to prevent cache lines from being written to memory in an improper order, the WSO transactions initiated by a processor are ordered with respect to one another within the processor. Thus, if a processor initiates a WSO transaction involving cache line A, followed by a WSO transaction involving cache line B, the WSO transaction involving cache line A (i.e., the write of cache line A to memory) should be completed by the processor before the WSO transaction involving cache line B can proceed. In addition, when a processor initiates a WSO transaction to a cache line, the processor locks the cache line and prevents further accesses of the cache line until the WSO transaction is completed. Moreover, WSO transactions do not provide the initiating processor with read access or local write access to the cache line, nor is the cache line placed in the initiating processor's local cache.

Unlike WS transactions, during a WSO transaction involving a particular cache line, upon detecting that another processor has initiated a WSO transaction or a WS transaction involving the same cache line, the home node can send an ABORT request to the processor that initiated the WSO transaction. The ABORT request is intended to cause the initial WSO transaction to be terminated so that the subsequent WSO transaction involving the same cache line can proceed.

In some embodiments of the present invention, the initiating processor does not automatically abort the WSO transaction upon receiving the ABORT request from the home node. Instead, the initiating processor first determines if: (1) the cache line data has already been sent to the home node; or (2) the WSO transaction is the processor's oldest pending write operation. If not, upon receiving the signal to abort the transaction, the initiating processor aborts the WSO transaction. The processing subsystem can then retry the aborted WSO transaction. Otherwise, if the data has already been sent or if the WSO transaction is the processor's oldest pending write, the processor can respond to the home node with an ACKN packet to deny the abortion of the WSO transaction. The processor then completes the WSO transaction (i.e., writes the data to the home node).

Using WSO transactions, it is possible to cause data starvation of a given processor. This can occur when a first processor initiates a WSO transaction for a cache line for which one or more other processors subsequently initiate WSO transactions. In this case, even though the first processor may repeatedly retry aborted transactions, the other processor(s) can initiate their WSO transactions in a pattern that causes the first processor's WSO transactions to always be aborted. Thus, in some embodiments, upon aborting and retrying the same WSO transaction a predetermined number of times, the processor sends a "forward-progress" signal to the home node for the cache line, wherein the forward-progress signal ensures that a next time that the aborted WSO transaction is retried, the WSO transaction completes, thereby enabling the first processor to make progress in performing computational operations.

In some embodiments of the present invention, the forward-progress signal is a packet (e.g., a FWDPRG packet) or another such signal. In these embodiments, receiving the forward-progress signal causes the home node to deny subsequently received WSO requests until the first processor completes its WSO transaction. In alternative embodiments, upon a predetermined number of WSO transactions being cancelled, the first processor sends a WS transaction request. The WS transaction is not aborted by the home node upon receiving subsequent WSO requests, thus enabling the first processor to make forward progress. In addition, in some embodiments, receiving a WS request causes the home node to send an ABORT request to a processor in an attempt to abort any outstanding WSO transaction, thereby enabling the WS transaction to proceed immediately. In alternative embodiments, a WSO transaction is not aborted by the initiating processor, thereby enabling forward progress. For example, when the WSO transaction is the oldest outstanding writestream or when the initiating processor has already forwarded the data to the home node.

In some embodiments, a complication arises when an ABORT request with a given transaction ID is received after the cache line data has been sent to the home node for the write. More specifically, using a given transaction ID as identification, an ABORT packet can be identified as coming from a given WSO transaction despite the fact that the processor regards the transaction as being completed. Thus, a race can occur if the transaction ID is used in a subsequent transaction (i.e., a WSO transaction or another type of transaction). In the event that an ABORT packet is received with a transaction ID for a transaction that cannot be aborted, these embodiments can ignore the abort packet (e.g., with a subsequent WS transaction that reuses the same transaction ID). However, if the transaction ID has been used for another WSO transaction, the transaction can be falsely aborted. Falsely aborting subsequent WSO transactions in this way is detrimental to performance (because the transaction is restarted), but does not cause the corruption of data. In some embodiments, in order to avoid this issue, the home node sends a "done with store" message, which frees an associated transaction ID for guaranteed safe use for another transaction. For example, in some embodiments, the home node sends a final ACKN packet to the initiating processor to indicate that the write has completed, thereby ending the transaction and freeing the transaction ID.

Recall that the WSO transaction is a speculative transaction. Accordingly, the original state of the initiating processor and the home node should be able to be restored in the event that the WSO transaction is aborted. Hence, in some embodiments, during a WSO transaction, a copy of the value that was stored in the cache line prior to the WSO transaction is retained at the home node. For example, the cache line at the home node may be locked before the cache line data is written during the WSO transaction to protect the original state of the home node. Alternatively, the original copy of the cache line can be held in a temporary buffer in the home node, the initiating processor, or both. As another example, if the home node determines that another processor has a dirty copy of the cache line for which the home node receives a WSO request, the home can send a CPI packet, rather than an INV packet, to the processor with the dirty copy, and the home node can then lock the received data until the WSO completes or aborts. (Sending the CPI packets in response to receiving WSO requests is described below with respect to FIG. 9.)

In some embodiments of the present invention, the WSO transaction may be used for strongly ordered full-cache line DMA write operations. In these embodiments, the initiating processing subsystem 102 is a DMA engine.

Although we describe an ABORT request and a corresponding ABORT packet, some embodiments of the present invention use a different type of packet to abort the WSO transaction. Generally, the request sent from the home node to the initiating processor is sufficient to inform the processor that the home node requests the abortion of the WSO transaction. For example, some embodiments may use an ACKN packet to request the initiating processor to abort the WSO transaction.

Note that although existing systems include a variant of the WSO transaction, in contrast to embodiments of the present invention, the existing systems require that each processor keep a "timer" associated with each WSO transaction initiated by the processor. When the timer overflows (i.e., when a predetermined time expires), the WSO transaction is terminated by the processor (by sending a termination message to the home node). Although avoiding the deadlock encountered with WS transactions, requiring the use of timers in these WSO transactions in the existing systems increases the complexity of the design and makes verification significantly more difficult. In addition, the use of timers can reduce the performance of the system. For example, if the timer is too long, the processors can unnecessarily sit idle. However, if the timer is too short, transactions can be unnecessarily terminated. Specifically, if the timer is too short, a transaction can be assumed deadlocked when a PULL response for the transaction is simply taking too long to return. Note that if the PULL response for a given transaction always takes too long to return (i.e., if the return of the PULL packet is not being delayed due to a temporary problem), a transaction may never complete successfully.

In comparison to the existing systems, embodiments of the present invention provide improved performance and simplified design and verification by enabling the home node (and not the processor, as in existing systems) to determine when multiple WSO transactions are conflicting and abort the appropriate transactions at the home node. These embodiments do not require the use of a timer at the home node to track the age of each outstanding WSO transaction.

Performing WriteStream Ordered Transactions

Generally, in embodiments of the present invention, the WSO transaction occurs as follows. An initiating processor (e.g., a processing subsystem 102) first sends a WSO request for a cache line A to a home node for the cache line. If a record in the home node (e.g., in a directory in the home node) for the cache line indicates that there are no shared or modified copies of the cache line in other processors, the directory responds with a PULL request to the initiating processor. The initiating processor then responds with a DATA or ACKN packet.

Alternatively, if the cache line is recorded in the directory as being shared by another processor (i.e., potentially held by any other processor in an "S" state), before sending the PULL request to the initiating processor, the directory sends an INV packet to each potential sharer. In response, each potential sharer invalidates its copy of the cache line and sends an acknowledgment to the directory or directly to the initiating processor, to avoid latency and avoid unnecessary bandwidth consumption. (Note that a potentially sharing processor simply responds with an acknowledgment if the cache line is no longer present in the sharing processor's cache.) The directory then proceeds with the PULL request to the initiating processor as described above.

Alternatively, if the cache line is recorded in the directory as being held by another processor in a modified state (i.e., potentially held by the other processor in the "M" state), before sending the PULL request to the initiating processor, the directory sends a CPI packet to the owner (i.e., the potential owner). If the cache line is dirty in the owner's cache, the owner responds to the directory with the data; otherwise, the owner responds to the directory with an acknowledgment. The directory then proceeds with the PULL request to the initiating processor as described above.

Figure 7:
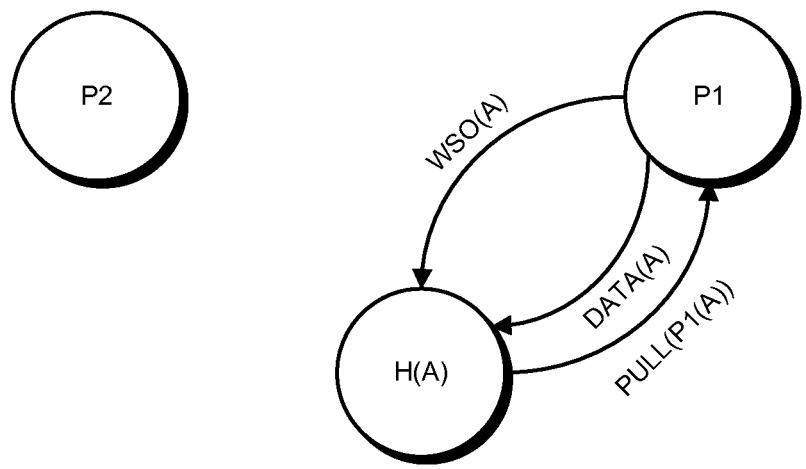
FIG. 7 presents a flowchart illustrating a WSO transaction where no other processors are recorded in the home node as holding a copy of the cache line in accordance with embodiments of the present invention.
Figure 8:
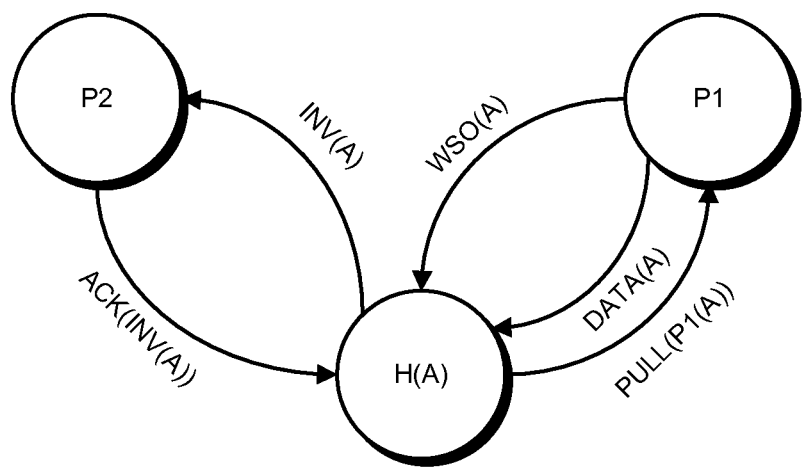
FIG. 8 presents a flowchart illustrating a WSO transaction where another processor is recorded in the home node as holding a shared copy of the cache line in accordance with embodiments of the present invention.
Figure 9:
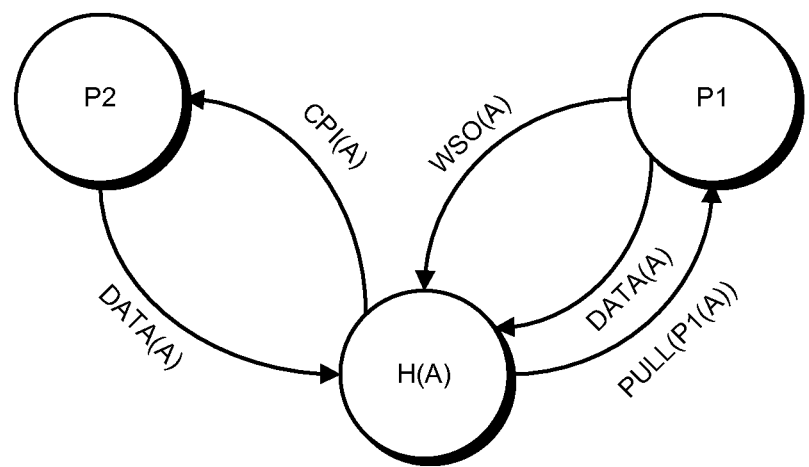
FIG. 9 presents a flowchart illustrating a WSO transaction where another processor is recorded in the home node as holding a modified copy of the cache line in accordance with embodiments of the present invention.

FIGS. 7-9 present flowcharts illustrating the above-described WSO transactions in accordance with embodiments of the present invention. FIG. 7 presents a flowchart illustrating a WSO transaction where no other processors are recorded in the home node as holding a copy of the cache line. FIG. 8 presents a flowchart illustrating a WSO transaction where another processor is recorded in the home node as holding shared copies of the cache line. FIG. 9 presents a flowchart illustrating a WSO transaction where another processor is recorded in the home node as holding a modified copy of the cache line. In FIGS. 7-9, the initiating processor (i.e., the processing subsystem 102 initiating the WSO transaction) is identified as P1, the home node of the corresponding cache line is identified as H(A), and the other processor is identified as P2.

Note that for the purpose of illustration we present exemplary packets with particular formats, such as packet format "PULL(P1(A))." However, embodiments of the present invention can generally use any packet format that can be interpreted and understood by the receiving processing subsystem 102 or memory subsystem 104. For example, in some embodiments, each packet includes a number of bits that are organized into fields, each field containing digitally encoded information required for processing the request. In some embodiments, one of the fields in the some or all of the packets contains a transaction ID that is designated by the initiating processor. The transaction ID is used to keep track of the transaction for which sent and received packets are intended. In these embodiments, a transaction ID may be included with packets sent and received by the processor and/or the home node during the transaction to enable the processor and the home node to determine the transaction to which the packet applies.

As shown in FIG. 7, the WSO transaction starts when P1 sends a WSO request ("WSO(A)") to home node H(A) for the cache line. H(A) determines that no other processor is recorded as having a copy of the cache line. H(A) then sends a PULL request ("PULL(P1(A))") to P1 to request the write data for cache line A. P1 then conveys a DATA response ("DATA(A)") that includes the write data to H(A). H(A) then stores the entire cache line in memory.

As shown in FIG. 8, the WSO transaction starts when P1 sends a WSO request ("WSO(A)") to H(A) for the cache line. H(A) determines that P2 is recorded as potentially having a shared copy of the cache line and sends an INV request ("INV(A)") to P2. If P2 still holds a copy of the cache line, P2 then invalidates its copy of the cache line. P2 then sends an ACK response ("ACK(INV(A))") to H(A). After receiving the ACK from P2, H(A) sends a PULL request ("PULL(P1 (A))") to P1 to request the write data for cache line A. P1 then conveys a DATA response ("DATA(A)") that includes the write data to H(A). H(A) then stores the entire cache line in memory.

As shown in FIG. 9, the WSO transaction starts when P1 sends a WSO request ("WSO(A)") to H(A) for the cache line. H(A) determines that P2 is recorded as having a modified copy of the cache line and sends a CPI request ("CPI(A)") to P2. P2 then sends a DATA response ("DATA(A)") to H(A). After receiving the DATA response from P2, H(A) sends a PULL request ("PULL(P1(A))") to P1 to request the write data for cache line A. P1 then conveys a DATA response ("DATA(A)") that includes the write data to H(A). H(A) then stores the entire cache line in memory.

Note that although FIGS. 7-9 present particular sequences of requests and responses, embodiments of the present invention may follow other sequences of requests and responses. For example, P2 in FIG. 9 may return an ACKN response to H(A)'s CPI request. In this case, the WSO transaction initiated by P1 may stall, awaiting a PULL request from H(A). Alternatively, H(A) may respond to P1 with an ABORT response or an ACKN response to cause P1 to abort the WSO transaction. P1 can then retry the WSO transaction.

Figure 10:
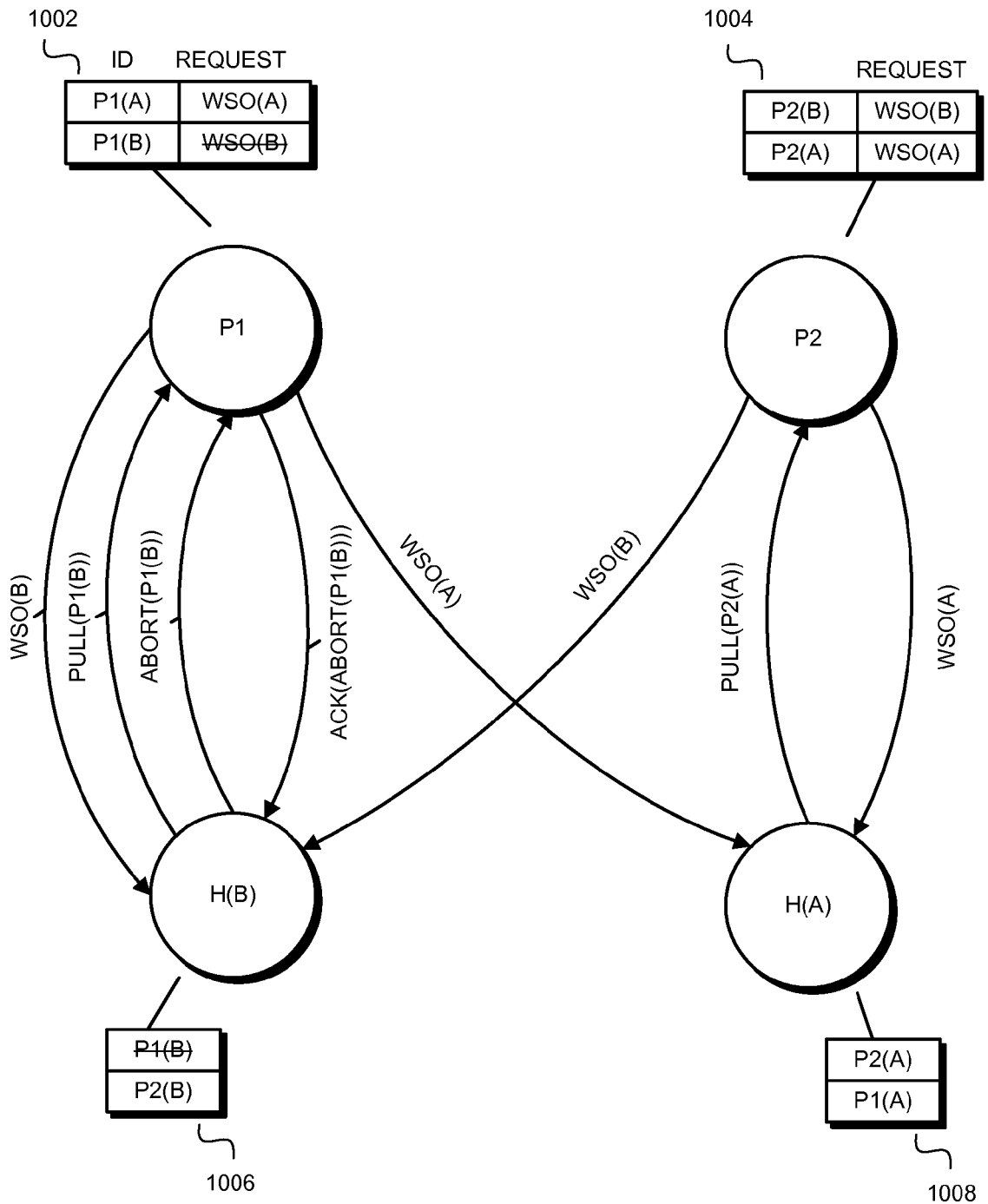
FIG. 10 presents a flowchart illustrating an exemplary WSO transaction in accordance with embodiments of the present invention.

FIG. 10 presents a flowchart illustrating an exemplary WSO transaction in accordance with embodiments of the present invention. Note that the sequence of WSO requests generated by the processors in FIG. 10 is similar to the sequence of WS requests generated by the processors in FIG. 6 and that the embodiment shown in FIG. 10 requires strong ordering semantics, meaning that WSO transactions initiated by a given processor should be completed in order. However, in accordance with the properties of the WSO transaction (and in comparison to the WS transaction illustrated in FIG. 6), the deadlock that occurs using WS transactions is avoided.

FIG. 10 shows a first processor P1, a second processor P2, a home node H(B) of a cache line B, and a home node H(A) of a cache line A. Tables 1002 and 1004 in FIG. 10 illustrate the order of WSO requests sent by processors P1 and P2, respectively. As shown, tables 1002-1004 each include a separate row for each WSO request. The tables include a column which stores an identifier ("ID") that is used to uniquely identify the request, and a column ("Request") that identifies the corresponding request. In the tables, the higher entries represent older requests. Therefore, in table 1002, the request identified as P1(A) occurred before the request identified as P1(B). Tables 1006 and 1008 illustrate the order in which WSO requests are received by H(B) and H(A), respectively. As with tables 1002-1004, higher rows of tables 1006 and 1008 represent older requests.

As shown in FIG. 10, processors P1 and P2 initiate separate sequences of WSO requests for cache lines A and B. Processor P1 sends a WSO request for cache line A ("WSO(A)"), followed by a WSO request for cache line B ("WSO(B)"). At the same time, processor P2 sends a WSO request for cache line B ("WSO(B)"), followed by a WSO request for cache line A ("WSO(A)"). As shown in table 1006, home node H(B) receives processor P1's WSO request for cache line B prior to receiving processor P2's WSO request and, as shown in table 1008, home node H(A) receives processor P2's WSO request for cache line A prior to receiving processor P2's WSO request. (Note that H(B) receives P1's WSO(B) and sends the PULL request ("PULL(P1(B))") to P1 before receiving P2's WSO(B).)

Recall that a home node attempts to abort an existing WSO transaction upon receiving a subsequent WSO request that is directed to the same cache line. In FIG. 10, because H(B) first received a WSO request for cache line B from P1 and then from P2, H(B) sends an ABORT signal to P1 to abort P1's WSO transaction involving cache line B. Specifically, as shown in FIG. 10, H(B) sends an ABORT request ("ABORT (P1(B))") to P1. Note that in alternative embodiments, other packet types can be used by H(B) to signal the abortion of the WSO transaction. For example, a variant of the ACK packet type could be used, such as an ACKN request (ACKN(P1(B))).

In some embodiments, the home node can abort an outstanding WSO transaction upon receiving a subsequent WSO request even if a PULL request has already been sent to the processor that initiated the outstanding WSO transaction. In other words, the home node aborts the outstanding WSO transaction even if data has already been requested from the processor that initiated the WSO transaction. For example, the ABORT request that is sent from H(B) to P1 after H(B) receives the WSO request from P2 ("ABORT(P1(B))") is sent, despite the fact that the PULL request ("PULL(P1(B))") has already been sent to P1.

As described above, upon receiving the ABORT request ("ABORT(P1(B))"), P1 determines whether: (1) the WSO transaction is the oldest WSO transaction initiated by P1; or (2) the data for the WSO transaction has already been sent. If either is found to be true, P1 does not abort the WSO transaction, but instead continues the WSO transaction, sending an ACKN response ("ACKN(ABORT(P1(B)))"—not shown in FIG. 10) to H(B) to indicate that the WSO transaction is still outstanding. However, because the P1(B) WSO transaction is younger than the P1(A) WSO transaction, and because no data (i.e., DATA packet) has been sent from P1 to H(B), P1 aborts the transaction and sends an ACK(P1(B)) packet to H(B).

The aborted transaction is indicated by the strikethrough for the entries for the WSO transaction in table 1002 and table 1006. By aborting the transaction in this way, the system avoids the deadlock that can occur during a similar sequence of WS transactions.

Note that although a similar set of WSO requests are received at home node H(A) in FIG. 10, a description of the handling of the WSO requests is not included because the handling of the sequence at H(A) is similar to the handling of the above-described sequence.

Figure 11:
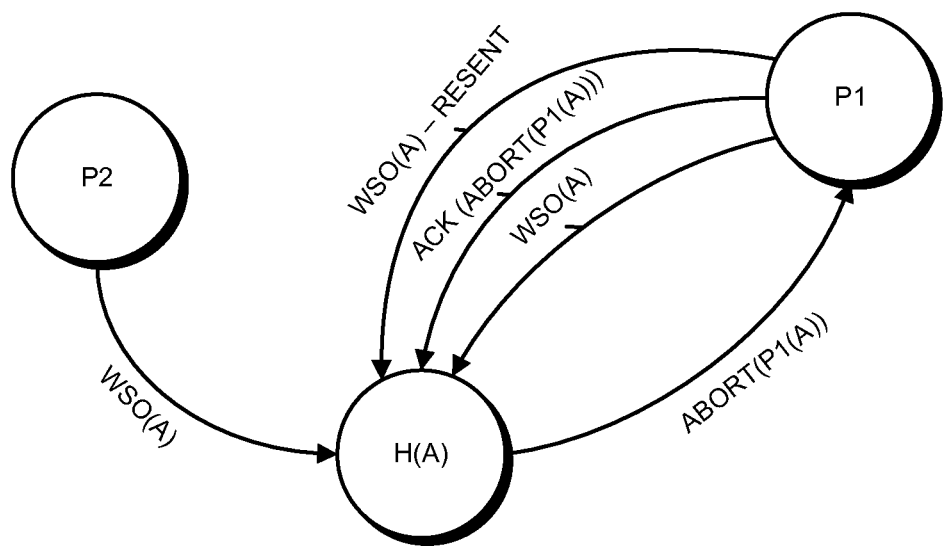
FIG. 11 presents a flowchart illustrating an exemplary WSO transaction in accordance with embodiments of the present invention

FIG. 11 presents a flowchart illustrating an exemplary WSO transaction in accordance with embodiments of the present invention. In FIG. 11, a WSO transaction is aborted and then successfully retried by a processor. FIG. 11 shows a first processor P1, a second processor P2, and a home node H(A) of a cache line A.

As shown in FIG. 11, processors P1 and P2 initiate separate WSO requests for cache line A ("WSO(A)"). H(A) receives the WSO request from P1 before receiving the WSO request from P2. Therefore, as described above, H(A) sends an ABORT packet to P1 ("ABORT(WSO(A))") to abort P1's WSO transaction. P1 aborts the WSO transaction and responds to the ABORT packet with an ACK packet ("ACK (ABORT(P1(A)))") that informs H(A) that P1 has aborted the transaction. P1 then subsequently resends the WSO request ("WSO(A)"—resent) to restart the WSO transaction, which then successfully completes.

In some embodiments, the WSO request is resent by P1 after a predetermined delay to allow P2's WSO transaction to complete. Otherwise, if P2's WSO transaction is still proceeding, it can be aborted by the re-sent WSO request from P1.

Figure 12:
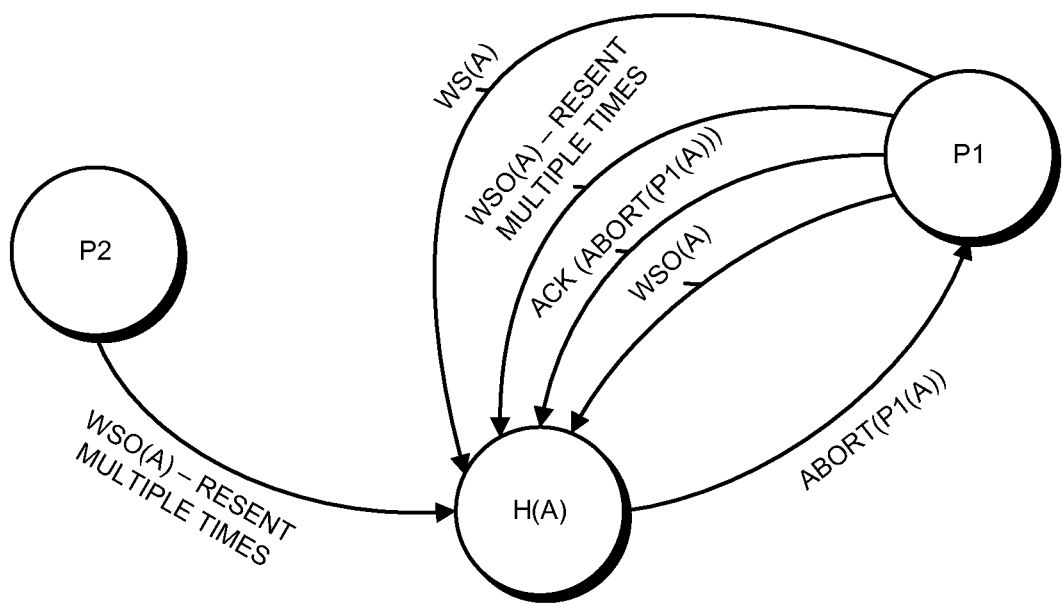
FIG. 12 presents a flowchart illustrating an exemplary WSO transaction in accordance with embodiments of the present invention

Recall that P1 can retry an aborted transaction a predetermined number of times and, if the transaction continues to be aborted, P1 can use a forward progress mechanism to ensure that P1 can continue to perform useful computational work. FIG. 12 presents a flowchart illustrating an exemplary WSO transaction in accordance with embodiments of the present invention. In FIG. 12, a WSO transaction is aborted and unsuccessfully retried a predetermined number of times by a processor before the processor uses a forward progress mechanism to ensure forward progress. FIG. 12 shows a first processor P1, a second processor P2, and a home node H(A) of a cache line A.

As shown in FIG. 12, processors P1 and P2 initiate separate WSO requests for cache line A ("WSO(A)"). H(A) receives the WSO request from P1 before receiving the WSO request from P2. Thus, H(A) sends an ABORT packet to P1 ("ABORT (WSO(A))") to abort P1's WSO transaction. P1 aborts the WSO transaction and responds to the ABORT packet with an ACK packet ("ACK(ABORT(P1(A)))") that informs H(A) that P1 has aborted the transaction. P1 subsequently resends the WSO request ("WSO(A)"—resent) to restart the WSO transaction while P2's WSO transaction is still in progress, thereby causing H(A) to abort P2's WSO transaction. However, also P2 resends its WSO request, thereby causing H(A) to again send an ABORT packet to P1 ("ABORT(WSO(A))") to abort P1's WSO transaction. This sequence of P1 and P2 initiating WSO transactions and having them aborted occurs multiple times.

After having the WSO transaction aborted in this way a predetermined number times, P1 uses a forward progress mechanism to ensure forward progress. Thus, as shown in FIG. 12, P1 sends a WS request ("WS(A)") in place of the WSO request. The WS transaction that is started by the WS request cannot be aborted any subsequent WSO request. In addition, in some embodiments, receiving the WS request from P1 also causes H(A) to abort P2's WSO transaction, thereby ensuring that P1's WS request starts a WS transaction immediately.

Although we show an embodiment where a transaction is aborted multiple times before a WS request is sent (i.e., the predetermined number of aborted transactions is greater than one), in some embodiments, upon having a transaction aborted once, the processor sends a WS request. Moreover, as described above, in alternative embodiments, a different forward progress mechanism is used. For example, in FIG. 12, P1 may have sent a forward-progress signal to H(A) to cause H(A) to deny other WSO requests until P1's WSO transaction was completed.

Figure 13:
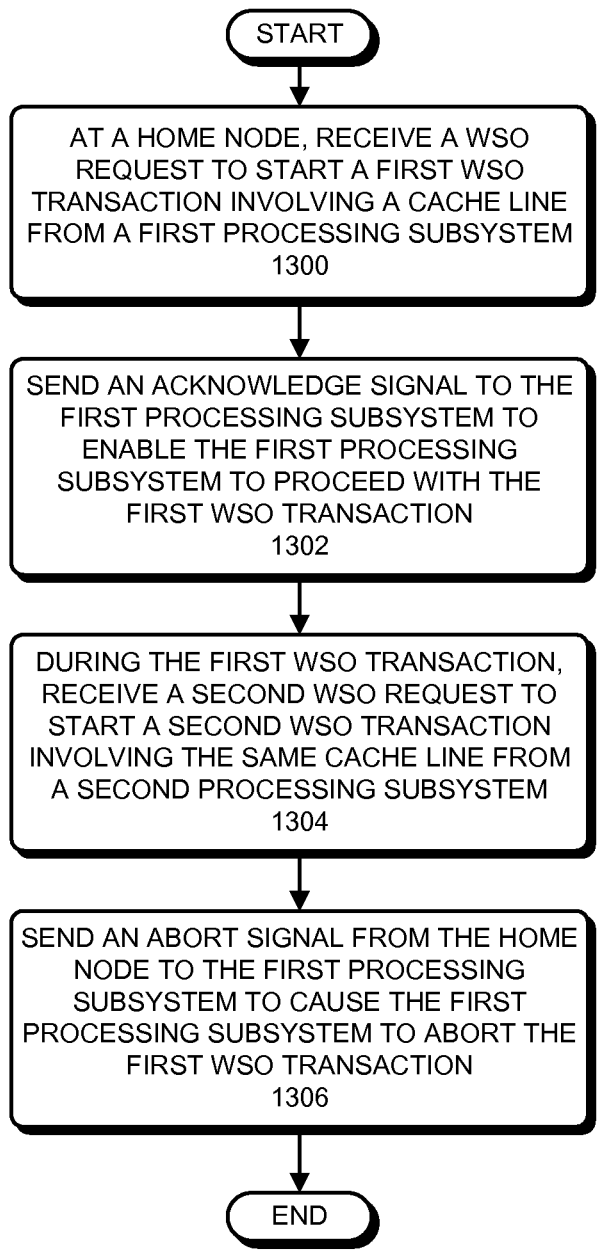
FIG. 13 presents a flowchart illustrating operations performed during an exemplary WSO transaction in accordance with embodiments of the present invention.

FIG. 13 presents a flowchart illustrating operations performed during an exemplary WSO transaction in accordance with embodiments of the present invention. Note that the WSO transaction described in FIG. 13 involves a similar sequence of WSO requests as the sequence of WSO requests received at H(A) in FIG. 10. Thus, if WS requests were received in the same pattern as the WSO requests in FIG. 10, the processing subsystems would deadlock (as shown in FIG. 6).

FIG. 13 starts with a home node receiving a writestream ordered (WSO) request to start a first WSO transaction from a first processing subsystem (step 1300). The WSO request identifies a cache line to be written during the first WSO transaction.

Next, the home node sends an acknowledge signal to the first processing subsystem to enable the first processing subsystem to proceed with the first WSO transaction (step 1302). During the first WSO transaction, the home node receives a second WSO request to start a second WSO transaction from a second processing subsystem, wherein the second WSO request identifies the same cache line as to be written during the second WSO transaction (step 1304).

In response to receiving the second WSO request, the home node sends an abort signal to the first processing subsystem to cause the first processing subsystem to abort the first WSO transaction (step 1306).

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for performing a speculative writestream transaction, comprising:
    at a home node, receiving a writestream ordered (WSO) request to start a first WSO transaction from a first processing subsystem, wherein the WSO request identifies a cache line to be written during the first WSO transaction, wherein during a WSO transaction, an entire cache line is written from a processing subsystem to the home node without obtaining write permission for the cache line in the processing subsystem and without storing a copy of the cache line in a local cache in the processing subsystem, and wherein the home node does not use a timer to track the age of an outstanding WSO transaction;
    sending an acknowledge signal to the first processing subsystem to enable the first processing subsystem to proceed with the first WSO transaction;
    during the first WSO transaction, receiving a second WSO request to start a second WSO transaction from a second processing subsystem, wherein the second WSO request identifies the same cache line as to be written during the first WSO transaction;
    and in response to receiving the second WSO request, sending an abort signal from the home node to the first processing subsystem to cause the first processing subsystem to abort the first WSO transaction;
    receiving a denial signal from the first processing subsystem in response to the abort signal, wherein the abort signal indicates that the first processing subsystem will not abort the first WSO transaction and that the first processing subsystem is proceeding with the first WSO transaction;
    subsequently receiving the cache line from the first processing subsystem at the home node; and
    writing the cache line to memory in the home node;
    wherein the first processing subsystem sends the denial signal when the WSO transaction is an oldest cache line write operation pending for the first processing subsystem or when the first processing subsystem has already sent the cache line to the home node to be written.

2. The method of claim 1, wherein the method further comprises:
    receiving an acknowledge signal from the first processing subsystem in response to the abort signal, wherein the acknowledge signal indicates that the first processing subsystem has aborted the first WSO transaction.

3. The method of claim 2, wherein the method further comprises:
    subsequently receiving a WSO request to retry the aborted first WSO transaction that is sent from the first processing subsystem; and
    sending the acknowledge signal to the first processing subsystem to enable the first processing subsystem to retry the first WSO transaction.

4. The method of claim 3, wherein the method further comprises:
    upon receiving a WSO request from another processing subsystem during the retried first WSO transaction, sending the abort signal to the first processing subsystem to cause the first processing subsystem to again abort the first WSO transaction; and
    upon aborting and retrying the first WSO transaction a predetermined number of times, receiving a forward-progress signal from the first processing subsystem, wherein the forward-progress signal ensures that a next time that the aborted first WSO transaction is retried, the first WSO transaction completes.

5. The method of claim 4, wherein receiving the forward-progress signal involves receiving a request to start a WS transaction instead of a WSO transaction from a first processing subsystem, wherein the request to start the WS transaction identifies the cache line as to be written during the WS transaction, and wherein the WS transaction is not aborted by subsequent WSO requests involving the same cache line.

6. The method of claim 2, wherein the method further comprises:
    subsequently receiving a WS request to retry the aborted first WSO transaction that is sent from the first processing subsystem; and
    sending the acknowledge signal to the first processing subsystem to enable the first processing subsystem to perform a WS transaction in place of the aborted first WSO transaction.

7. The method of claim 1, wherein sending the acknowledge signal involves sending a PULL request to cause the first processing subsystem to send data for the entire cache line to the home node for storage in a memory.

8. An apparatus for performing a speculative writestream transaction, comprising:
    a first processing subsystem;
    a second processing subsystem; and
    a home node coupled to the first processing subsystem and the second processing subsystem;
    wherein the home node is configured to receive a writestream ordered (WSO) request to start a first WSO transaction from the first processing subsystem, wherein the WSO request identifies a cache line to be written during the first WSO transaction, wherein during a WSO transaction, an entire cache line is written from a processing subsystem to the home node without obtaining write permission for the cache line in the processing subsystem and without storing a copy of the cache line in a local cache in the processing subsystem, and wherein the home node does not use timers to track the ages of WSO transactions;
    wherein the home node is configured to send an acknowledge signal to the first processing subsystem to enable the first processing subsystem to proceed with the first WSO transaction;
    wherein during the first WSO transaction, the home node is configured to receive a second WSO request to start a second WSO transaction from a second processing subsystem, wherein the second WSO request identifies the same cache line as to be written during the first WSO transaction; and wherein in response to receiving the second WSO request, the home node is configured to send an abort signal from the home node to the first processing subsystem to cause the first processing subsystem to abort the first WSO transaction;

wherein the home node is configured to:

receive a denial signal from the first processing subsystem in response to the abort signal, wherein the denial signal indicates that the first processing subsystem will not abort the first WSO transaction and that the first processing subsystem is proceeding with the first WSO transaction; and subsequently receive the cache line from the first processing subsystem and write the cache line to a memory in the home node;

wherein the first processing subsystem is configured to send the denial signal when the WSO transaction is an oldest cache line write operation pending for the first processing subsystem or when the first processing subsystem has already sent the cache line to the home node to be written.

9. The apparatus of claim 8, wherein the home node is configured to:

receive an acknowledge signal from the first processing subsystem in response to the abort signal, wherein the acknowledge signal indicates that the first processing subsystem has aborted the first WSO transaction.

10. The apparatus of claim 9, wherein the home node is configured to:

subsequently receive a WSO request to retry the aborted first WSO transaction that is sent from the first processing subsystem; and send the acknowledge signal to the first processing subsystem to enable the first processing subsystem to retry the first WSO transaction.

11. The apparatus of claim 10, wherein upon receiving a WSO request from another processing subsystem during the retried first WSO transaction, the home node is configured to send the abort signal to the first processing subsystem to cause the first processing subsystem to again abort the first WSO transaction; and upon aborting and retrying the first WSO transaction a predetermined number of times, the home node is configured to receive a forward-progress signal from the first processing subsystem, wherein the forward-progress signal ensures that a next time that the aborted first WSO transaction is retried, the home node allows the first WSO transaction to complete.

12. The apparatus of claim 11, wherein when receiving the forward-progress signal, the home node is configured to receive a request to start a WS transaction instead of a WSO transaction from a first processing subsystem, wherein the request to start the WS transaction identifies the cache line as to be written during the WS transaction, and wherein the home node is configured not to abort the WS transaction upon receiving subsequent WSO requests involving the same cache line.

13. The apparatus of claim 9, wherein the home node is configured to:

subsequently receive a WS request to retry the aborted first WSO transaction that is sent from the first processing subsystem; and send the acknowledge signal to the first processing subsystem to enable the first processing subsystem to perform a WS transaction in place of the aborted first WSO transaction.

14. The apparatus of claim 8, wherein when sending the acknowledge signal, the home node is configured to send a PULL request to cause the first processing subsystem to send data for the entire cache line to the home node for storage in a memory.

15. An apparatus for performing a speculative writestream transaction, comprising:

a processing subsystem coupled to a memory subsystem;

wherein the processing subsystem is configured to send a writestream ordered (WSO) request to start a WSO transaction to the memory subsystem, wherein during a WSO transaction, an entire cache line is written from a processing subsysstem to the home node without obtaining write permission for the cache line in the processing subsystem and without storing a copy of the cache line in a local cache in the processing subsystem, and wherein the home node does not use timers to track the ages of WSO transactions;

upon receiving an acknowledge signal from the memory subsystem, the processing subsystem is configured to proceed with the WSO transaction;

upon receiving an abort signal from the memory system during the WSO transaction, the processing subsystem is configured to end the WSO transaction;

wherein during the WSO transaction, the home node is configured to receive a second WSO request to start a second WSO transaction from a second processing subsystem, wherein the second WSO request identifies the same cache line as to be written during the WSO transaction; and wherein in response to receiving the second WSO request, the home node is configured to send an abort signal from the home node to the processing subsystem to cause the processing subsystem to abort the first WSO transaction;

wherein the home node is configured to:

receive a denial signal from the processing subsystem in response to the abort signal, wherein the denial signal indicates that the processing subsystem will not abort the first WSO transaction and that the processing subsystem is proceeding with the first WSO transaction; and subsequently receive the cache line from the processing subsystem and write the cache line to a memory in the home node;

wherein the processing subsystem is configured to send the denial signal when the WSO transaction is an oldest cache line write operation pending for the processing subsystem or when the processing subsystem has already sent the cache line to the home node to be written.

16. The apparatus of claim 15, wherein the processing subsystem is configured to end the WSO transaction by:

immediately aborting the WSO transaction; and sending an acknowledge signal to the memory subsystem.

* * * * *